United States Patent [19]

Staudenmaier

[11] Patent Number: 4,468,019

[45] Date of Patent: Aug. 28, 1984

[54] PALLET CLAMPING SYSTEM FOR MACHINE TOOLS

[75] Inventor: Siegfried Staudenmaier, Laubach, Fed. Rep. of Germany

[73] Assignee: A Römheld GmbH & Co. KG, Laubach, Fed. Rep. of Germany

[21] Appl. No.: 382,326

[22] Filed: May 26, 1982

[30] Foreign Application Priority Data

May 29, 1981 [DE] Fed. Rep. of Germany ....... 3121330

[51] Int. Cl.³ .............................................. B23Q 7/00
[52] U.S. Cl. ........................................ 269/56; 269/58; 269/99
[58] Field of Search .......................... 198/345; 29/33 P; 269/55, 56, 57, 58, 74, 95, 99–100, 20, 309–310

[56] References Cited

U.S. PATENT DOCUMENTS

| | | | |
|---|---|---|---|
| 1,393,083 | 10/1921 | Campbell | 269/99 |
| 2,903,120 | 9/1959 | Thomas | 198/345 |
| 2,908,303 | 10/1959 | Schmidt | 269/100 |
| 2,988,234 | 6/1961 | Barothy et al. | 198/345 |
| 4,174,828 | 11/1979 | Bergman | 269/20 |
| 4,335,499 | 6/1982 | Prat | 198/345 |

Primary Examiner—Robert C. Watson
Attorney, Agent, or Firm—Flynn, Thiel, Boutell & Tanis

[57] ABSTRACT

Clamping cylinders (8) are built into a pallet (1) for clamping on a machine tool table (2). Tongues (14) are connected to the pistons (10) of the clamping cylinders (8), which tongues project over the bottom surface (6) of the pallet (1) and fit into normal T-slots (15) of a machine tool table (2). The tongues (14) are clamped in the clamping position by cup spring sets (11) in the T-slots (15). To release the pallets the clamping cylinders (8) are loaded with pressure fluid, which is supplied through a hydraulic coupling (18, 27), which is automatically coupled together when a moving rod (3b) engages the pallet (1). The novel system permits the use of pallets (1) for clamping of workpieces to be worked, without need for significant changes in the machine tool table (2) (FIG. 2).

11 Claims, 8 Drawing Figures

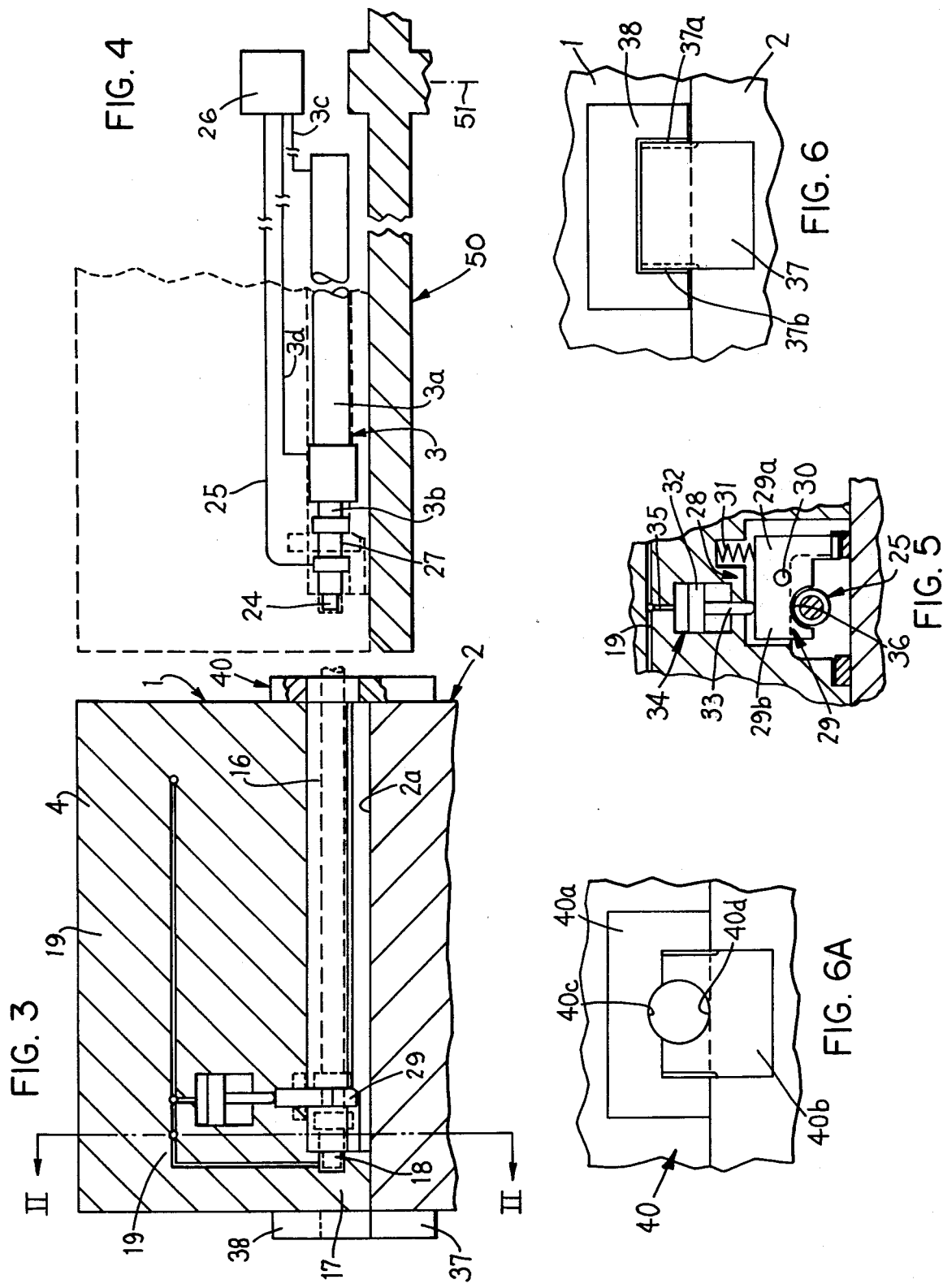

PALLET CLAMPING SYSTEM FOR MACHINE TOOLS

FIELD OF THE INVENTION

The invention relates to a pallet clamping system for machine tools comprising a pallet with a pallet member, on which are provided an upper clamping surface for the workpieces which are to be worked, a bearing surface to rest on a machine tool table and clamping and positioning mechanisms for clamping and positioning the pallets on the machine tool table.

BACKGROUND OF THE INVENTION

Pallet clamping systems have the advantage that the often lengthy clamping of a workpiece to be worked on a pallet can take place at a secondary place, while the machine tool works a different workpiece. After this working is finished it is possible to quickly remove the worked workpiece from the machine tool in a short time by pulling the pallet off from the machine tool table and it is possible also within a short time to move the workpiece to be worked into position for working by mounting the earlier equipped pallet on the machine tool table. The idle times of the machine tool are thus reduced to a minimum. Turntables which can receive two pallets are advantageously used for changing the pallets.

Known is a pallet clamping system, in which clamping bars are inserted in slots of machine tool tables, in which clamping bars are provided clamping cylinders. For this special slots are needed in the machine tool table, which slots have a substantially larger inside cross section than normal slots. Therefore during re-equipping of a machine tool for pallet clamping many modifications must be carried out on the machine tool table. Systems are also known for smaller pallets, in which conical pins are provided on the machine tool table, which pins engage holes in the pallet and onto which the pallet must be fixedly pressed by means of clamping mechanisms. Considerable modifications must in this system also be carried out on the machine tool table. Furthermore, it is known to laterally grip around the machine tool table with clamping elements. This also requires special tables. Furthermore the pallet can only be clamped at its outermost edge.

The basic purpose of the invention is to produce a pallet clamping system, in which without modification normal machine tool tables can have pallets clamped thereto.

This purpose is attained according to the invention, by the clamping mechanisms having cylinders, which are located completely within the pallet member, with at least one-sidedly hydraulically loadable pistons having secured thereon piston rods which project beyond the bearing surface and carry tongues, which fit in normal (i.e. conventional) table slots, for example T-slots, of a machine tool table.

When putting on a pallet the tongues are positioned so that they can be moved along the slots, when the pallet is moved above, or closely above, the machine tool table. When the pallet has reached its correct position relative to the working (i.e. machining) tools, the pallet is fixed by activating the cylinders, whereby the tongues are pulled fixedly against the upper walls of the slots.

In principle both double-acting hydraulic cylinders and also single-acting hydraulic cylinders can be used. It is particularly advantageous to produce the clamping force by springs and to utilize the hydraulic fluid only for releasing. This has the advantage that also after a long-lasting uncoupling of one pressure source for hydraulic fluid the clamping force is maintained. However, it is also possible to produce the clamping force hydraulically. In the case of the high sealing capability of hydraulic systems which can be achieved today, the clamping force is maintainable for a long time, even after uncoupling of the hydraulic liquid pressure source. A storage means which can balance out small pressure-medium losses is here formed by the hydraulic fluid itself, which with pressures as high for example as 500 bar, as may be used here, is compressed approximately 3 percent in volume. When hydraulic clamping is used, it is possible to produce the clamping release movement selectively also hydraulically or through spring force. When hydraulic clamping is used, of course a constant connection to the pressure source can also be maintained, so that even with a certain amount of leakage a loss of the clamping force is not created.

The cylinders can be arranged in different ways. An advantageous arrangement locates the cylinders at the corners of a rectangle, with the cylinders aligned in groups along the table slots. The arrangement should be such that the tongues of all cylinders are introduced into the table slots during a movement of the pallet parallel to the longitudinal direction of the table slots.

All clamping cylinders are connected advantageously to one single hydraulic coupling part. One avoids in this manner several hydraulic connections, which, however, in principle are also possible. The need for a hydraulic installation on the tool machine is avoided if the hydraulic fluid is supplied through a push rod which moves the pallet during changing of pallets. Guiding of the hydraulic fluid along the push rod can occur for example directly in said rod, which is for example easily possible in the case of a hydraulic cylinder or, however, through a parallel installed line, like a hose.

A mechanism for the mechanical coupling between push rod and pallet is provided. A sure supply and discharge of hydraulic fluid is achieved, if the mechanical coupling engages when the hydraulic coupling is completed. Hydraulic operation of the mechanical coupling has the advantage, that an additional control line or an additional manual operation is avoided. If, as is preferably the case, the hydraulic fluid is to be supplied and discharged through one line, it is advantageous.

Provision of a tunnel for the engagement of the push rod has the advantage that, during moving of a pallet onto the machine tool table, the push rod applies its force to the front part of the pallet, so that the moving force on the pallet is substantially pulling and not pushing. This is advantageous in order to avoid relative canting of the pallet and table and thus to avoid wear.

Additional means can be provided for exact positioning of the pallet on the table.

BRIEF DESCRIPTION OF THE DRAWINGS

One exemplary embodiment of the invention is illustrated in the drawings, in which:

FIG. 3 is a horizontal cross-sectional view along the line III—III of FIG. 2, FIG. 4 illustrates a moving cylinder, FIG. 5 is a view corresponding with the arrows V—V of FIG. 1 and showing a separate illustration of a mechanical coupling mechanism, FIG. 6 is a view corresponding to the arrow VI of FIG. 1 and showing a positioning mechanism, FIG. 6A is a view similar to FIG. 6 showing a positioning mechanism at the opposite end of the table.

DETAILED DESCRIPTION

Figure 1:
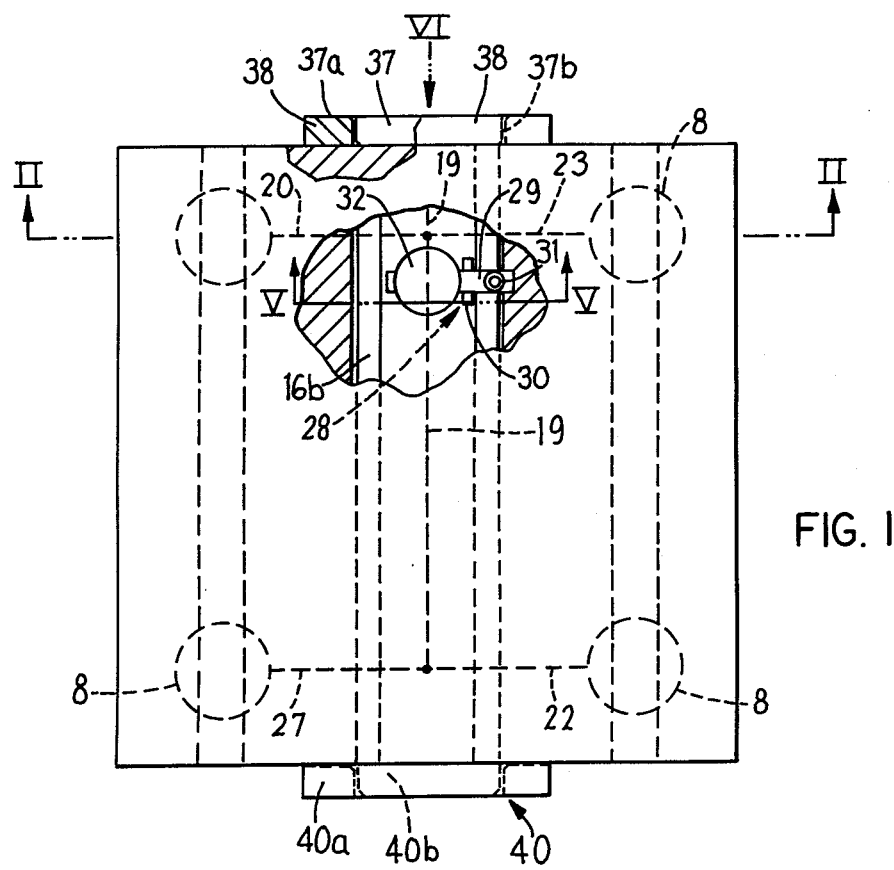
FIG. 1 is a partially broken top view corresponding with arrow I of FIG. 2 and showing a pallet which sits on a machine tool table, with T-slots in the upper surface of the pallet omitted to clarify the showing of other structure.

The main part of the pallet clamping system is a pallet which is identified as a whole by reference numeral 1 (FIG. 1). The pallet is designed for mounting on a machine tool table 2. The drawing shows the mounted position of the pallet. A moving cylinder 3 (FIG. 4) is used for moving the pallet 1 onto the machine tool table 2 and for removing same from the machine tool table 2. The structure of these main parts will be described in detail hereinafter.

The pallet 1 has a pallet member 4 with an upper clamping surface 5 and a lower bearing surface 6. T-slots 7, for engagement by clamping elements, not shown, are provided in the clamping surface 5, by which clamping elements a workpiece is fixed on the clamping surface 5. For example, the workpiece may be a complicated casting. The lower bearing surface 6 is substantially closed.

Four clamping cylinders 8 are located in the pallet member 4. Each clamping cylinder 8 has a cylindrical opening, or chamber 9, in which a piston 10 is movable. A set 11 of individual cup springs 11a is provided below the piston 10. The cup spring set 11 as a whole forms a compression spring, which tries to move the piston 10 upwardly. Above the piston 10 there is a space 12, to which is connected a hydraulic line. The hydraulic lines associated with the diverse clamping cylinders 8 are identified by respective reference numerals 20, 21, 22 and 23 in FIG. 1.

A downwardly projecting piston rod 13 is secured on the piston 10, at the lower end of which piston rod is secured a tongue 14, which has a T-shaped cross-section and fits into a T-slot 15 of the machine tool table. In the preferred embodiment shown, each tongue 14 is long enough to connect to two piston rods 13. The length of the piston rod 13 and the length of the cup spring set 11 are so adjusted to one another that, when the tongue 14 rests on the upper boundary surfaces 15a of the T-slot 15 of the machine tool table 2, the cup spring set 11 still produces a force which is sufficient for reliably fixing the pallet 1 on the table 2.

Figure 2:
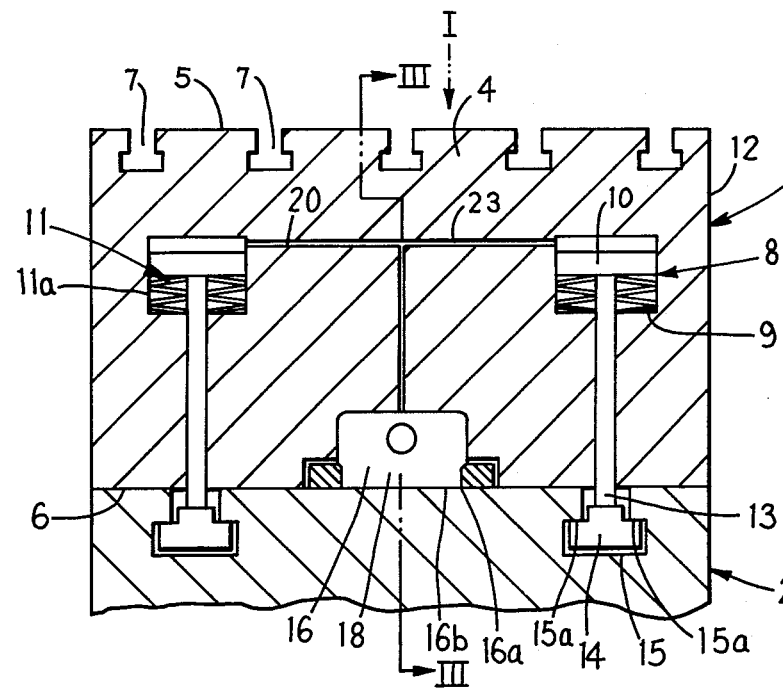
FIG. 2 is a vertical cross-sectional view along the line II—II of FIG. 1 or along the line II—II of FIG. 3.

A tunnel 16 is provided on the underside of the pallet member 4, which tunnel, as seen in FIG. 3, is open to the right and is closed off to the left by a wall 17. Recesses 16a (FIG. 2) in the pallet 1 flank the tunnel 16 for guiding the pallet 1 on rails 16b fixed atop the table 2. A depression 18, from which starts out a hydraulic line 19, is provided in the wall 17 and serves as a first hydraulic coupling part. The above-mentioned branch lines 20 through 23 start out from the line 19, through which branch lines the four clamping cylinders 8 are connected to the hydraulic pressure line 19.

The moving cylinder 3 has a cylinder part 3a and a piston rod 3b. It is a double-acting pressure fluid cylinder with opposite ends connected to a selectively actuable pressure source 26 by lines 3c and 3d, by which forces can thus be applied to extend and retract the piston rod 3b.

The front end 24 of the piston rod 3b is constructed as a second hydraulic coupling part, which can engage pressure-tight in the depression 18 of the pallet member 4. The second hydraulic coupling part 24 is connected to the pressure source 26 through a pressure hose 25. When the second coupling part 24 engages in the first coupling part 18, the poppet valve cones 53 and 54 are pushing each other back, opening the flow of pressure oil through the hydraulic line 25 into the line 19 or it can be removed from same. A threaded ring 59 carrying the seals set 62/63 is threaded into the coupling sleeve 65. Threaded ring 59 is press-fitted onto coupling nose piece 55.

Another ring 66, carrying the seals set 67/68 and 69 is housed within the coupling sleeve 65. Ring 66 has a limited radial floating motion within the coupling sleeve 65 in order to align freely with nose piece 70 during the coupling process. Furthermore, it provides for the free downward motion of nose piece 70, when the pallet moves downward from the unclamped into the clamped position, while nose piece 55 at the front end 24 of the piston rod 3b is retained in its position. When the second coupling part 24 engages in the first coupling part 18 pressure oil can be forced through the hydraulic line 25 into the line 19 or can be removed from same.

A groove 27 for the mechanical coupling of the pallet 1 to the piston rod 3b is also provided on the piston rod 3b. A locking mechanism 28 (FIG. 5) is provided for said coupling in the pallet member 4. Said locking mechanism has a two-arm lever 29, which is pivotable about a bolt 30 fixed in the pallet member 4. A spring 31 backed by the pallet member 4 presses on the lever arm 29a, the upper end of which spring is supported on the pallet member. The piston rod 33 of a hydraulic cylinder 34 in the pallet member 4 presses on the other lever arm 29b. The hydraulic cylinder 34 is also connected to the pressure medium line 19 through a branch line 35. A rounded recess is provided on the underside of the lever arm 29b, which rounded recess is designed for gripping around the piston rod 3b. The width of the lever 29 is such that same fits into the groove 27 of the piston rod 3b.

For stopping the pallet 1 in its correct final leftward position shown in FIG. 3, a fixation mechanism comprising guide plates 37 and 38 (FIGS. 3 and 6) is provided. One guide plate 37 is secured to the rear end of the machine tool table 2, which plate 37 projects above the table surface 2a. The other guide plate 38 cooperates with the side surfaces 37a, 37b of said plate 37, and plate 38 is secured on the pallet 1 (see here also FIG. 6). A suitable fixation mechanism 40 is provided at the other end of the apparatus. Fixation mechanism 40 has guide plates 40a and 40b similar to mentioned guide plates 37 and 38, respectively. Guide plates 40a and 40b have opposing notches 40c and 40d for clearance reception therethrough of portions of the moving cylinder 3.

OPERATION

The pallet clamping system operates as follows. Illustrated is the condition, in which the pallet 1 is clamped on the machine tool table 2. The clamping force is produced by the cup spring sets 11, which press the tongues 14 fixedly against the undersides 15a of the table slots 15. The table slots 15 have normal dimensions. The hydraulic system is pressure-free during this clamping.

Figure 7:
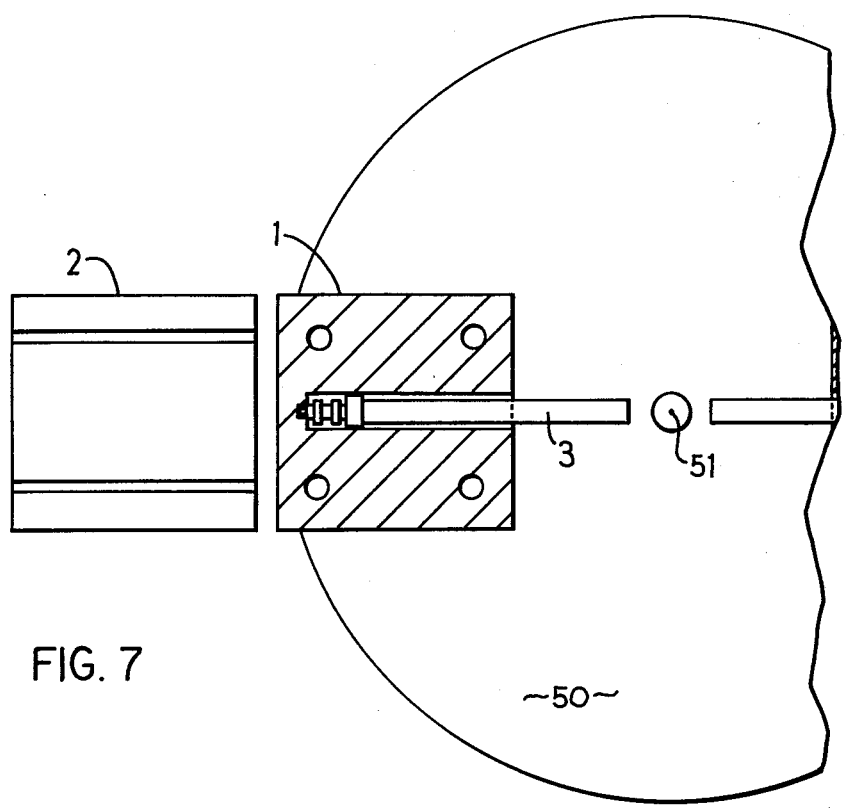
FIG. 7 is a partially broken top view showing a turntable loaded with a pair of pallets adjacent the table for receiving one of the pallets, in accord with the invention.

When a workpiece which is clamped on the pallet 1 has been finish worked, the piston rod 3b is moved into the tunnel 16 until the second hydraulic coupling part 24 sealingly engages the first hydraulic coupling part 18. Pressure oil is now pumped into the line 19, which first causes the piston 32 to be pressed downwardly in the cylinder 34 while overcoming the force of the spring 31, so that the lever 29 with its arm 29b is pressed into the groove 27 of the piston rod 3b. This mechanically locks the piston rod 3a axially with respect to the pallet 1. The oil finally presses the pistons 10 of the clamping cylinders 8 downwardly, whereby the cup spring sets 11 are compressed. This causes the tongues to be released from the surfaces 15a. Piston 32 advances before piston 10 starts to move, since piston 10 is pre-loaded with the spring force of cup springs 11. This spring force has to be overcome by a hydraulic pressure built-up before piston 10 starts to move. The piston rod 3b is now pulled back, whereby the pallet 1 is pulled off the table 2. The pallet 1 can thereby be pulled onto a turntable 50 (FIG. 7), which on the other side of its axis 51 of rotation has already a newly equipped pallet 1a.

The turntable 50 is thereafter rotated, after which the pallet which is equipped with the new workpiece which must be worked is in front of the table 2. This new pallet is also moved by means of the moving cylinder 3 onto the machine tool table 2. A hydraulic and mechanical coupling of the pallet with the piston rod 3b is hereby also created as has already been described. During moving in there occurs an exact aligning by means of the described fixation mechanisms 37, 38 and 40. Opposed notches 40c and 40d in the adjacent central edges of the guide plates 40a and 40b accommodate protruding portions of the piston rod 3b and cylinder 3a during advancement of the piston rod into the tunnel 16 of the pallet 1 and during movement of the pallet 1 onto and off from the turntable 50. When the correct position is reached, the hydraulic pressure source 26 is switched over so that the pressure oil can discharge from the line 19 in response to decompression of the cup spring sets 11. This effects finally also the clamping of the pallet by pulling the tongues 14 toward the surfaces 15a of the slots 15.

Figure 8:
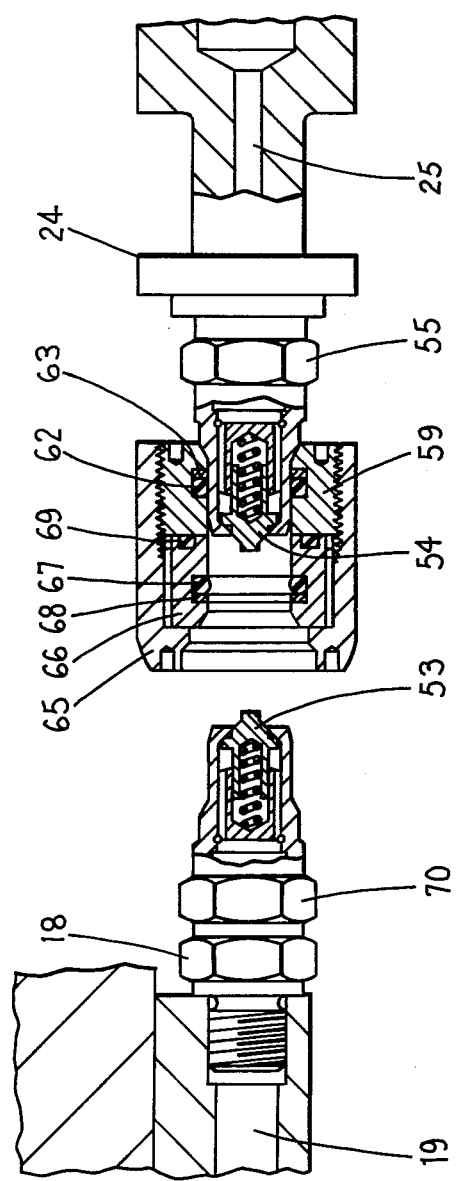
FIG. 8 is an enlarged fragment of FIG. 3 showing details of the engaged first and second hydraulic coupling parts of the pallet member depression and piston rod front end.

Sealed engagement of the second coupling part 24 on piston rod 3b into the depression 18 in pallet member 4 is obtainable by any convenient means, for example as illustrated in FIG. 8.

The embodiments of the invention in which an exclusive property or privilege is claimed are defined as follows:

1. A pallet clamping system for machine tools comprising:
   a pallet member, said pallet member having an upper clamping surface for workpieces which are to be worked and a bearing surface to rest on a machine tool table;
   clamping mechanisms carried by the pallet member for clamping the pallet member on the machine tool table, the clamping mechanisms having cylinders located completely within the pallet member, at least one-sidedly pressure fluid loadable pistons in said cylinders, and piston rods secured on the pistons, said piston rods projecting through the bearing surface and carrying tongues which fit into conventional table slots of a machine tool table;
   a pressure fluid coupling including a first coupling part located on the pallet member, and a pressure fluid line system extending in the pallet member to said cylinders for connecting said cylinders to the first coupling part for pressurizing of said pistons;
   a moving mechanism, which moving mechanism can engage the pallet for moving same with respect to said table, said pressure fluid coupling including a second coupling part which can engage the first coupling part and is located on the moving mechanism, which second coupling part is connected to a fluid pressure source.

2. A pallet clamping system according to claim 1, wherein said moving mechanism includes a push rod comprised by the piston rod of a pressure fluid cylinder, said second pressure fluid coupling part being located on said push rod.

3. A pallet clamping system according to claim 2, wherein the second coupling part is connected through an opening in the push rod, which opening extends along the push rod, to the pressure source.

4. A pallet clamping system according to claim 2, wherein the second coupling part is pressurized from the pressure source through a hose connected to the push rod at least near the second coupling part.

5. A pallet clamping system according to claim 2, including a mechanical coupling for locking the push rod on the pallet member in the coupled position of the first and second coupling parts.

6. A pallet clamping system according to claim 5, wherein the mechanical coupling is operable by means of a coupling pressure fluid cylinder connected for pressurization to the first coupling part.

7. A pallet clamping system according to claim 6, wherein the mechanical coupling includes a two-arm coupling lever, onto one arm of which coupling lever acts the coupling pressure fluid cylinder and onto the other arm of which coupling lever acts a release spring, wherein the coupling pressure fluid cylinder is pressurizable to press the coupling lever into its coupling position against the force of the release spring.

8. A pallet clamping system according to claim 2, wherein the underside of the pallet member has a tunnel for receiving the push rod, which tunnel extends approximately over the entire length of the pallet member, wherein the first coupling part is provided at the end of the tunnel remote from the input end of said tunnel.

9. A pallet clamping system according to claim 1, including guide plates on the machine tool table, which cooperate with guide parts on the pallet member.

10. A pallet clamping system according to claim 1, wherein said pressure fluid is hydraulic liquid.

11. A pallet clamping system according to claim 1, wherein the pistons are loaded by spring force in the clamping direction and are loaded hydraulically in the unclamping direction.

* * * * *